United States Patent [19]

Stokes

[11] Patent Number: 4,533,166

[45] Date of Patent: Aug. 6, 1985

[54] DOUBLE BEAM MOTOR VEHICLE BUMPERS

[75] Inventor: Vijay K. Stokes, Schenectady, N.Y.

[73] Assignee: General Electric Company, Schenectady, N.Y.

[21] Appl. No.: 481,681

[22] Filed: Apr. 4, 1983

[51] Int. Cl.³ .............................................. B60R 19/08
[52] U.S. Cl. ................................. 293/120; 293/155; 267/140
[58] Field of Search ............... 293/102, 120, 122, 132, 293/135, 136, 142, 155, 109, 110; 213/221; 267/140

[56] References Cited

U.S. PATENT DOCUMENTS

| | | | |
|---|---|---|---|
| 1,832,184 | 11/1931 | Christen | 293/136 |
| 3,734,554 | 5/1973 | Schwabenlender | 293/136 |
| 3,850,466 | 11/1974 | Yepis | 293/132 |
| 3,905,630 | 9/1975 | Cantrell | 293/102 |
| 3,927,907 | 12/1975 | Bialek | 293/135 |
| 4,003,594 | 1/1977 | Tommeraas | 293/131 |
| 4,018,299 | 4/1977 | Nagin et al. | 180/282 |
| 4,061,384 | 12/1977 | Montgomery et al. | 293/109 |
| 4,082,338 | 4/1978 | Hutai et al. | 293/136 |
| 4,192,538 | 3/1980 | Gulli | 293/134 |
| 4,193,621 | 3/1980 | Pelchi et al. | 293/142 |
| 4,252,355 | 2/1981 | Groupy et al. | 293/120 |
| 4,272,115 | 6/1981 | Stock | 293/155 |
| 4,363,474 | 12/1982 | Leblanc et al. | 267/140 |
| 4,427,225 | 1/1984 | Bauer et al. | 293/136 |

FOREIGN PATENT DOCUMENTS

| | | | |
|---|---|---|---|
| 2708856 | 10/1977 | Fed. Rep. of Germany | 293/122 |
| 2477084 | 9/1981 | France | 293/120 |

*Primary Examiner*—Robert B. Reeves
*Assistant Examiner*—Dennis H. Pedder
*Attorney, Agent, or Firm*—Mark L. Mollon; James C. Davis, Jr.; Marvin Snyder

[57] ABSTRACT

A bumper for a vehicle is provided with an inner beam member. Two longitudinally separated bumper supports affix the inner beam member to the vehicle. An outer beam member having interbeam support means positioned longitudinally displaced from the bumper supports affixes the outer beam member to the inner beam member in a spaced apart relationship. The interbeam supports and the bumper supports do not align in the transverse plane of the beam member. The outer beam member sustains the initial impact force in a collision.

4 Claims, 14 Drawing Figures

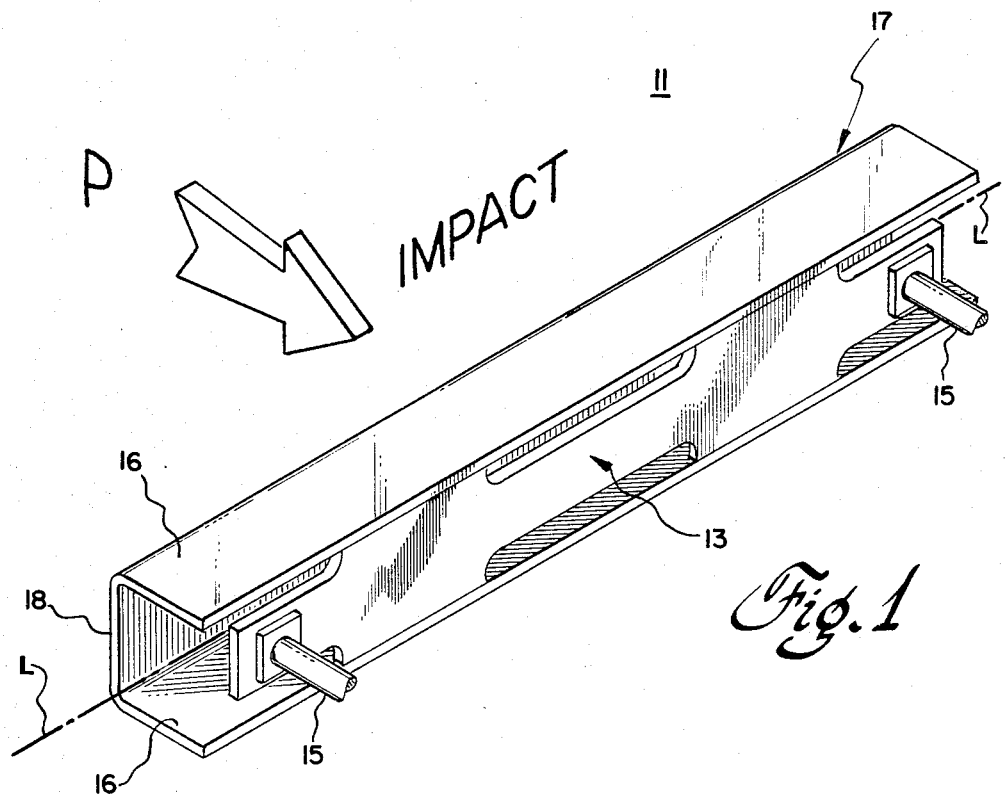
Fig. 1
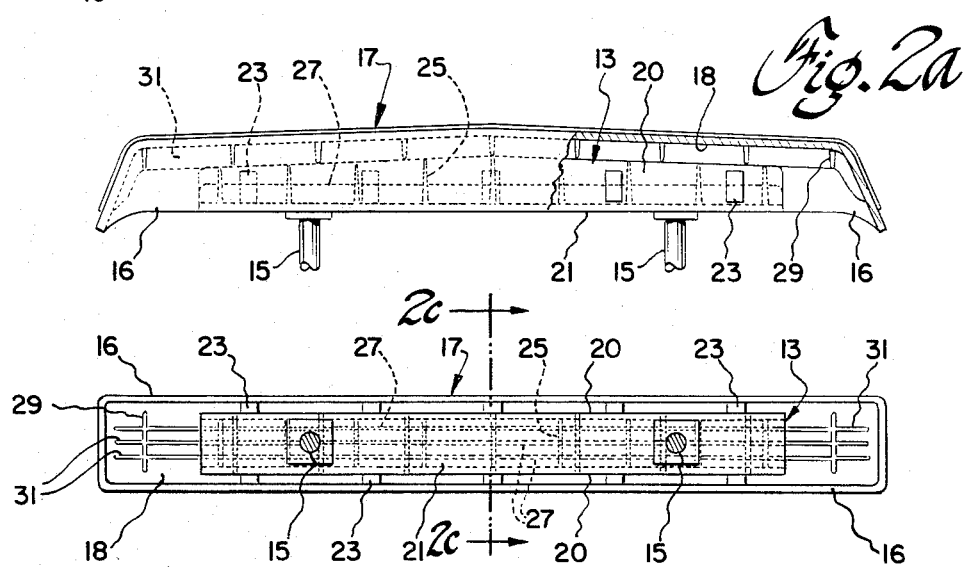
Fig. 2a
Fig. 2b

DOUBLE BEAM MOTOR VEHICLE BUMPERS

BACKGROUND OF THE INVENTION

This invention relates to vehicle bumpers and more particularly to a double beam configuration for motor vehicle bumpers.

Bumpers are used on motor vehicles, such as automobiles, to absorb light impacts and to prevent permanent damage from being caused to the automobile body during heavier impacts. A design objective of bumpers is to confine any permanent damage during impact to the bumpers which, presumably, can be replaced. The energy of impact must be absorbed or dissipated without permanently deforming the main structure of the automobile. In conventional designs the impact energy of light impacts is stored as elastic strain energy in the deformed bumper as well as in the automobile body. Conventional bumpers are designed to absorb the greater excess energy of heavier impacts by undergoing permanent plastic deformation, which can consist of small local dents or substantial deformations requiring the replacement of the bumper both for cosmetic reasons and in order to regain the lost protection against impacts. Such bumpers can absorb only very light impacts without undergoing some form of permanent deformation.

Existing automotive bumpers essentially are comprised of a beam (the bumper) on two supports, and are designed to absorb the energy of impact through elastic deformations. These bumpers all suffer from a major shortcoming, namely, for a given impact energy, the peak load experienced by the bumpers goes up drastically as the impact point moves closer to the support. Because of this phenomenon the bumper does not absorb any significant amount of energy for impacts squarely over the supports and, if shock absorbers are not used, such impact results in major irreversible damage to the bumper system.

In more recent designs, motor vehicle bumpers are connected to the vehicle body through shock absorbers which are capable of dissipating relatively large amounts of energy. As an example, the shock of impact on a bumper can be absorbed by pistons that force oil through small orifices, thereby dissipating large amounts of energy, and the assembly can be brought back to the initial state by means of springs. In this way it is possible to use relatively stiff bumpers that do not undergo local or global permanent deformations, but in which the bumper-piston assembly undergoes large displacements (stroke of piston forcing oil through small orifices), followed by complete recovery to the initial state. The cost of the bumper assembly is, however, substantial.

It is an object of the present invention to provide a motor vehicle bumper that is lightweight and relatively inexpensive and yet can sustain impacts of specified severity without undergoing permanent deformation.

It is a further object of the present invention to provide a plastic bumper that does not require shock absorber mounting to the motor vehicle body.

SUMMARY OF THE INVENTION

In one aspect of the present invention a bumper for a vehicle is provided with an inner beam member. Two longitudinally separated bumper supports affix the inner beam member to the vehicle. Interbeam support means positioned longitudinally displaced from the bumper supports affixes the outer beam member to the inner beam member in a spaced apart relationship. The interbeam supports and the bumper supports do not align in the traverse plane of the beam members. The outer beam member sustains the initial impact force in a collision.

BRIEF DESCRIPTION OF THE DRAWING

While the specification concludes with claims particularly pointing out and distinctly claiming the present invention, the objects and advantages of the invention can be more readily ascertained from the following description of preferred embodiments when used in conjunction with the accompanying drawing in which:

FIG. 1 is a perspective view of a vehicle bumper in accordance with the present invention;

DETAILED DESCRIPTION OF THE INVENTION

Figure 2C:
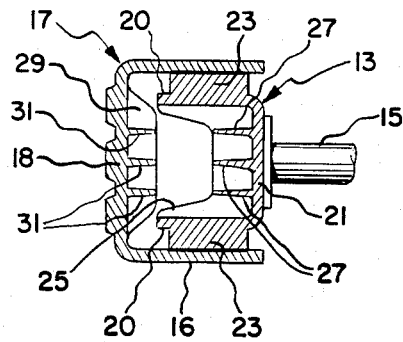
FIGS. 2a, b, c and d are a plan view, a rear view, a section view through the transverse plane 2c—2c in FIG. 2b, and a perspective view with part of the bumper broken away, respectively of another embodiment of the present invention.
Figure 2D:
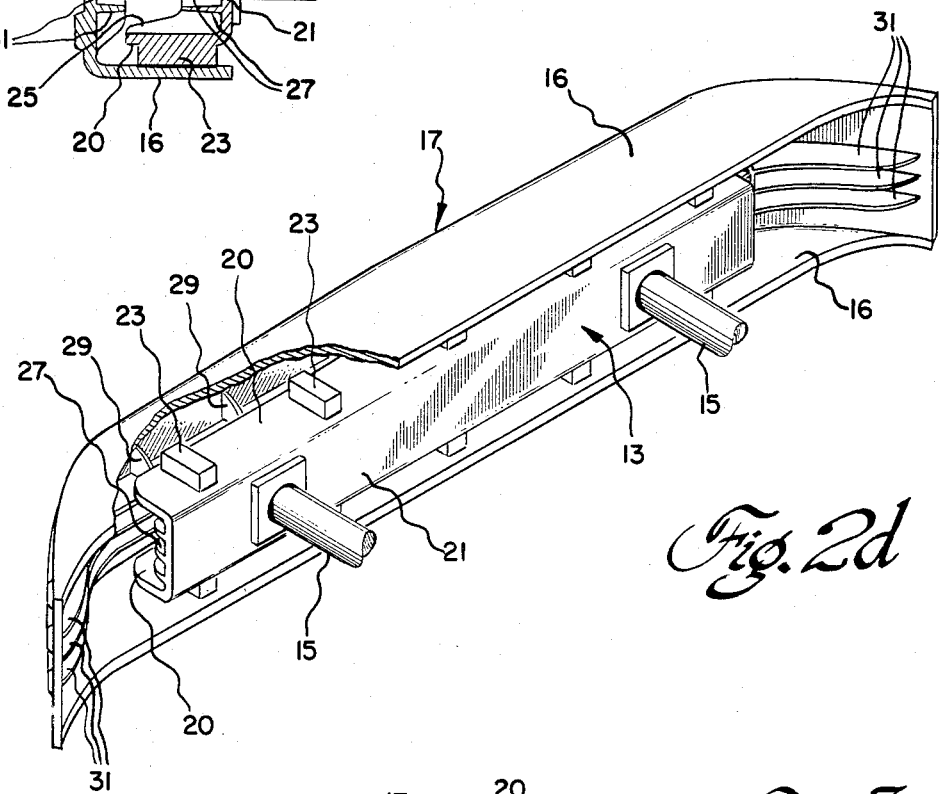

Referring now to the drawings wherein like reference numerals indicate like elements throughout, and particularly FIG. 1 thereof, one embodiment of a double beam motor vehicle bumper having a longitudinal axis L is shown. A planar inner beam member 13, preferably comprised of moldable thermoplastic, is affixed to longitudinally spaced apart bumper supports 15. The inner beam member 13 is positioned in, and the edges of the inner beam are attached to, the interior parallel sides 16 of a channel section shaped outer beam member 17 preferably comprised of moldable thermoplastic. The edges of the inner beam are attached to the outer beam so that vertical portion 18 which joins the two parallel sides 16 of the channel section 17 is parallel to and spaced apart from the planar inner beam. The edges of the inner beam are affixed to the interior sides of the channel intermediate the longitudinally spaced apart supports preferably by vibration welding, although the attachment could be made by induction welding (using a conductive insert between the pieces, for example) or adhesive bonding. It will be noted that the welded portions joining the inner and outer beams do not align with the bumper supports 15 in the transverse plane, i.e. a crosswise plane and especially at right angles, of the beam members. The impact arrow shows the outer beam sustaining the initial impact force P in a collision.

Referring now to FIGS. 2a, 2b 2c and 2d, another embodiment of a double beam bumper of moldable thermoplastic is shown. A channel section shaped inner beam 13 is positioned inside a contoured outer beam 17 which is channel shaped in cross section as can be seen in FIG. 2c. The inner beam 13 has two parallel side pieces 20 and a vertical piece 21 integrally joining the parallel pieces. The outer beam 17 has two parallel side pieces 16 and a vertical piece 18 integrally joining the parallel pieces. The inner beam 13 is situated inside the outer beam 17 with the inner vertical faces of the vertical portions of both beams being spaced apart and facing one another. Bumper supports 15 are longitudinally spaced apart on the exterior vertical face of the inner beam 13. The inner beam has transverse interbeam support sections 23 molded in the exterior sides of the beam. The transverse interbeam supports 23 are vibration welded to the inner faces of the side pieces of the outer beam so as to be integrally joined or connected to the outer beam intermediate the bumper supports and outside the bumper supports. The interbeam supports do not align vertically with the bumper supports.

As best shown in FIG. 2c, the channel-shaped inner beam is stiffened by transverse ribs 25 joining the sides 20 and vertical portion 21 of the channel, while longitudinal stiffeners 27 run between the ribs 25 and stiffen the vertical section 21 in the channel. The outer beam 17 has transverse ribs 29 stiffening the vertical portion 18 with longitudinal stiffeners 31 running between the ribs 29.

Figure 3A:
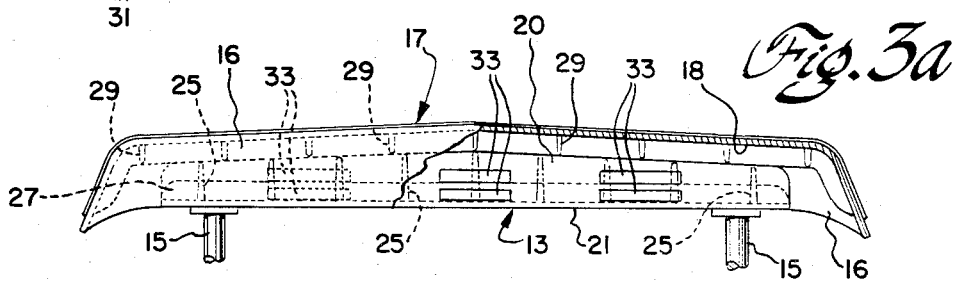
FIGS. 3a, b, c and d are a plan view, a rear view, a section view through the transverse plane 3c—3c in FIG. 3b, and a perspective view with part of the bumper broken away, respectively, of still another embodiment of the present invention.
Figure 3B:
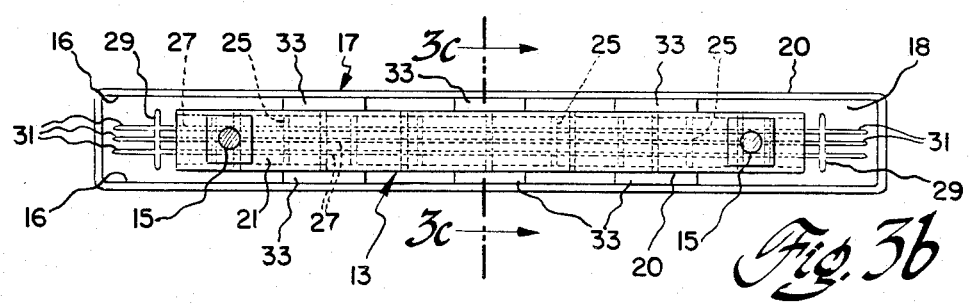
Figure 3C:
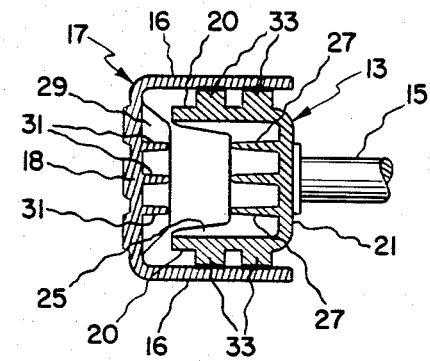
Figure 3D:
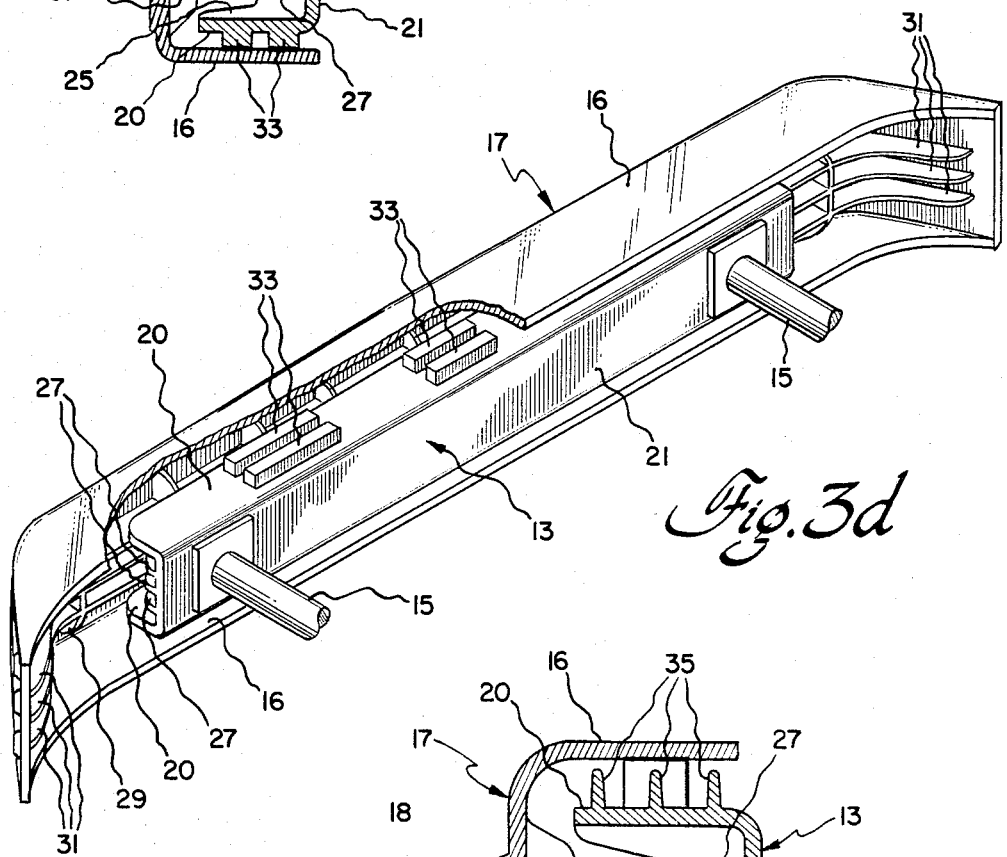

Referring to FIG. 3a another embodiment of a double beam bumper is shown. The bumper is similar to the bumper in FIG. 2 except that transverse interbeam supports are not used. In the embodiment of FIG. 3a, parallel rows of longitudinal interbeam supports 33 are used. The longitudinal interbeam supports are made up in sections (three sections of parallel rows are shown in the Figure) with the sections formed as integral parts of the exterior sides of the inner beam 13 as best seen in FIG. 3c. As visible in FIGS. 3a, 3b and 3d, the longitudinal interbeam supports 33 are located intermediate the bumper supports 15, and the bumper supports and interbeam supports do not touch any common transverse plane passing through the inner and outer beams.

Figure 4:
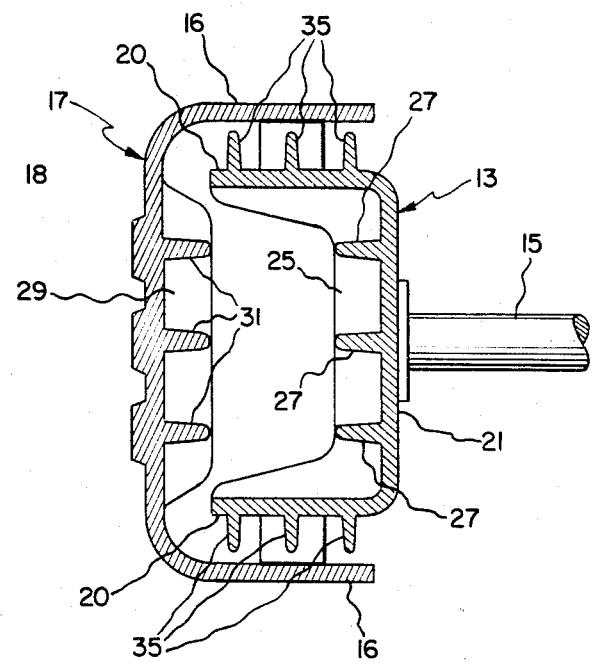
FIG. 4 is a side view of a bumper with a different beam stiffening arrangement suitable for use with the embodiments of FIGS. 2 and 3.

Referring now to FIG. 4, a section of a bumper is shown with additional longitudinal stiffeners 35 on the exterior of the sides 20 of the inner beam 13. The additional stiffeners could be used in the embodiment of FIGS. 2 or 3, if desired.

It is contemplated that the bumper can be fabricated from a number of moldable thermoplastics, such as polybutylene terephthalate (pbt), polycarbonate resin, or a blend of polyphenylene oxide mixed with rubber modified polystyrene, by separately forming the inner and outer beam using an injection molding process. The above moldable thermoplastics are available from the General Electric Company, for example, as Valox ®, Lexan ® and Noryl ®, respectively. Alloyed composition of the above such as pbt and polycarbonate available from General Electric Company as Xenoy TM could also be used.

Figure 5:
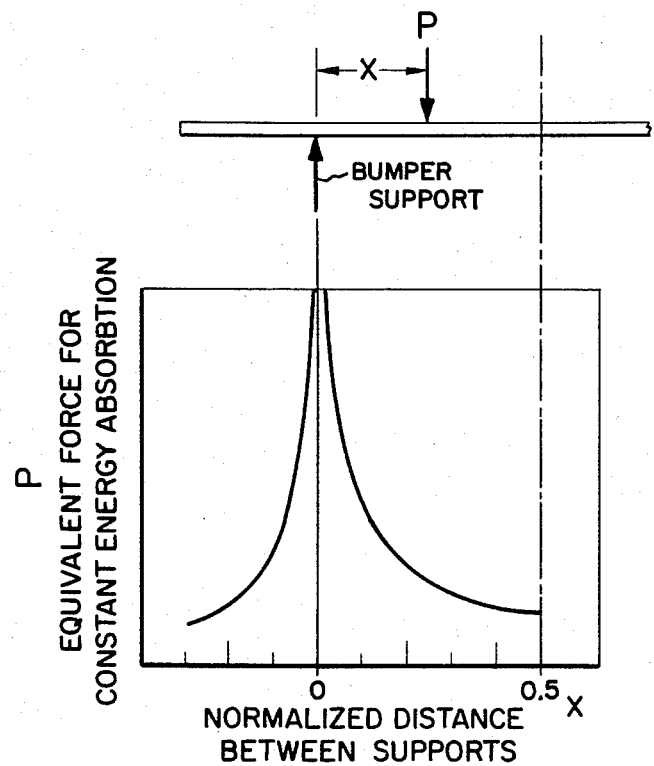
FIG. 5 is a free body diagram of half of a conventional bumper, together with a graph showing equivalent impact force versus distance of the impact force from the bumper support.

Operation of the double beam bumpers will now be discussed with reference to FIGS. 5 and 6. Referring first to FIG. 5, a simplified representation of half a conventional bumper design (i.e., single beam) and a support is shown. Below the beam is a graph of equivalent impact force resulting from absorbing a given impact energy versus a dimensionless distance x along the beam such that the bumper supports are at $x=0$ and $x=1$. The horizontal dimension of the beam and the abscissa of the graph are shown with the same scale and aligned vertically with one another. As can be seen from FIG. 5 for a given impact energy, the equivalent impact force P becomes excessively large for impacts near the support. Or, equivalently, for a fixed impact force the ability of a conventional bumper with a fixed support to absorb energy by elastic deformation goes toward zero as the impact point approaches the support. This happens since for impacts over the supports, the beam is not subject to any bending movement and is therefore not capable of storing any significant amount of elastic strain energy.

Figure 6:
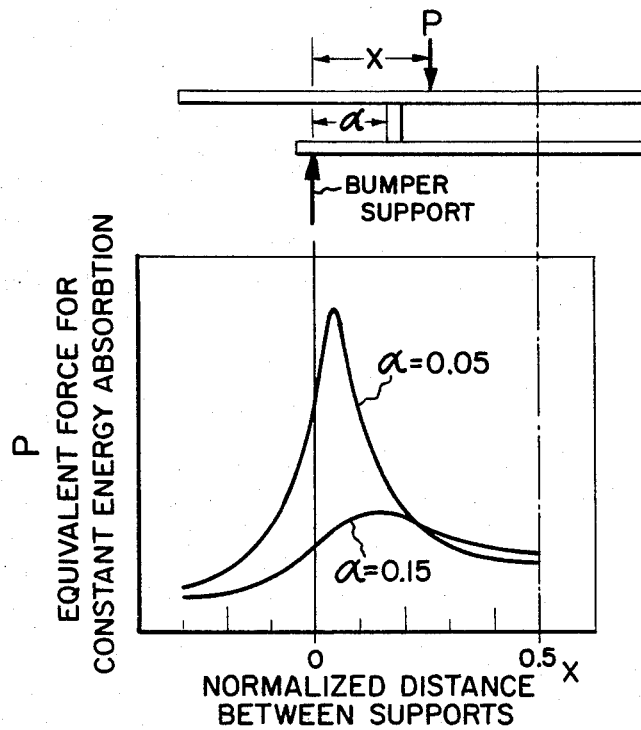
FIG. 6 is a free body diagram of half of a double beam bumper having two intermediate simple supports, together with a graph showing equivalent impact force versus distance of the impact force from the bumper support.

Referring now to FIG. 6, a simplified representation of half a double beam bumper is shown with a graph of equivalent impact force P resulting from absorbing a given impact energy versus distance along the beam from the bumper support to where the impact occurs. The horizontal dimension of the beam and the abscissa of the graph are drawn to the same scale and aligned vertically with one another. Curves are shown for different values of $\alpha$, where $\alpha$ is the nondimensional distance of the interbeam support from the bumper support, such that the bumper supports are at $x=0$ and $x=1$. As can be seen in FIG. 6, the magnitude of the impact load is relatively independent of the points of impact x when the bumper support and interbeam support are separated from one another.

Figure 7A:
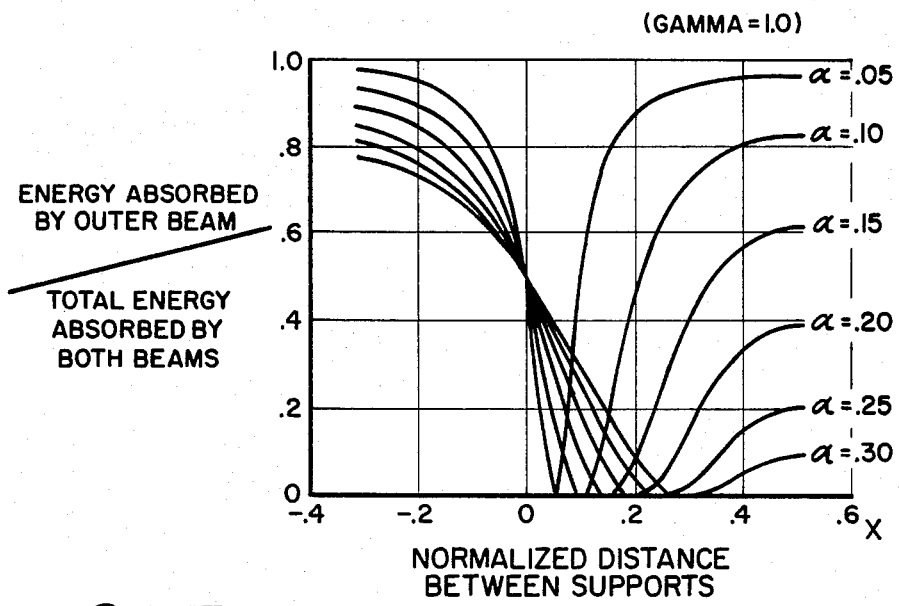
FIGS. 7a and b are graphs of the ratio of energy absorbed by the outer beam of the bumper of the present invention to the total energy absorbed versus distance of the impact force from the bumper support, for different positions of the interbeam support, the ratio of the outer beam stiffness to the inner beam stiffness in FIG. 7a being one and in FIG. 7b being one half.
Figure 7B:
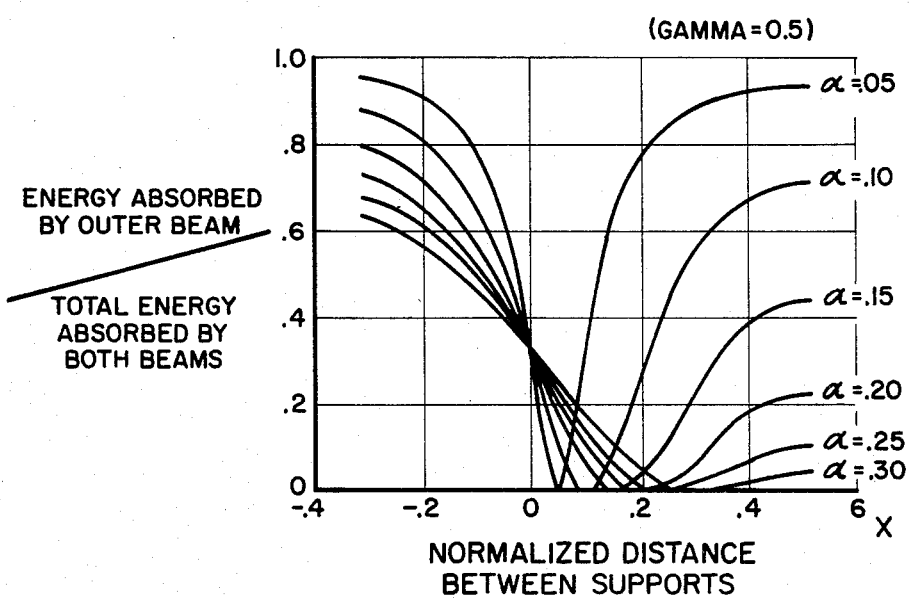

Referring now to FIGS. 7a and b, the ratio of the energy absorbed by the outer beam to the total energy absorbed by both beams versus the position of the impact force relative to the bumper support is plotted for several different spacings ($\alpha$) between one of the double beam bumper supports and an interbeam support for the range $0.05 \leq \alpha \leq 0.30$. The ratio of the stiffness (gamma) of the inner beam to the outer beam is one in FIG. 7a and one half in FIG. 7b. It can be seen that when the bumper support and interbeam support are assumed to be acting at single points along the beam the larger the spacing ($\alpha$) between the intermediate support and the bumper support the better energy sharing between the inner and outer beams. Also, for the range $0.5 \leq$ gamma $\leq 1$, the lower the ratio of stiffness of the inner beam to the outer beam the better the energy sharing between the beams.

The double beam bumper supports can be of the simple or fixed type. Simple supports permit rotation in a horizontal plane while fixed supports are rigidly fixed and do not permit rotation. The interbeam supports shown in FIGS. 1, 2, 3 and 4 are of the fixed type. Examples of fixed and simple bumper supports are shown in my copending application Ser. No., now U.S. Pat. No. 4,488,745, issued Dec. 18, 1984, entitled "Supports for Plastic Motor Vehicle Bumpers" filed on even date herewith and assigned to the same assignee as the present invention. My copending application is hereby incorporated by reference.

The choice of whether simple or fixed supports should be used depends upon the application. If larger deflections of the beams are permissible, then a simple support could be used to absorb more energy for the same amount of bumper material than a fixed support but with more deflection.

Fabrication of double beam bumpers with moldable thermoplatic offers many advantages such as light weight, low manufacturing cost, and easy styling. Other materials, however, can be used to fabricate double beam bumpers.

The foregoing describes a double beam motor vehicle bumper that can be designed to be relatively insensitive to the location of the point of impact as far as energy absorption and impact forces are concerned and therefor eliminate bumper shock absorbers which are presently required in conventional designs. The bumper of the present invention, if made of a moldable thermoplastic, can meet the styling requirements of modern automobiles and is easily fabricated.

While the invention has been particularly shown and described with reference to several preferred embodiments thereof, it will be understood by those skilled in the art that various changes in form and details may be made without departing from the spirit and scope of the invention.

What is claimed is:

1. A bumper for a vehicle, comprising:
   an outer beam member of a moldable thermoplatic, said outer beam member being a channel section shaped member having two inner parallel faces joined by a vertical portion;
   two longitudinally separated bumper supports for affixing said bumper to said vehicle; and
   an inner beam member of a moldable thermoplastic affixed to said bumper supports, said inner beam member having interbeam support means integrally jointed to said inner beam member and said inner parellel faces of said channel section shape member, said interbeam support means being longitudinally displaced from said longitudinally separated bumper supports for affixing said outer beam member in a spaced apart relationship with said inner beam member so that said interbeam support means is not transversely aligned with said longitudinally separated bumper supports, said inner and outer beam members absorbing the impact force in a collision.

2. The bumper of claim 1 wherein said inner beam member comprises a channel section shaped member, said inner beam channel section shaped member being positioned within said outer beam channel section shaped member, said inner beam channel section shaped member having two substantially parallel sides and a vertical piece integrally joining said sides, said inner and outer beams positioned so that said vertical piece and said vertical portion are spaced apart from each other.

3. The bumper of claim 2 wherein said interbeam support means is formed on the exterior sides of said inner beam channel section shaped member.

4. A bumper for a vehicle comprising:
   an inner beam member of moldable thermoplastic;
   two longitudinally separated bumper supports for affixing said bumper to said vehicle;
   an outer beam member of moldable thermoplastic, said outer beam member being a channel section shaped member having two substantially parallel sides joined by a vertical portion; and
   interbeam support means integrally joined to said parallel sides within the interior of said channel section shaped member, and interbeam support means being longitudinally displaced from said bumper supports so that said interbeam support means is not transversely aligned with said longitudinally separated bumper supports, said interbeam support means affixing said inner and outer beam members, said inner and outer beam members absorbing the impact force in a collision.

* * * * *